US009738493B2

(12) United States Patent
Fenker et al.

(10) Patent No.: US 9,738,493 B2
(45) Date of Patent: Aug. 22, 2017

(54) TOWER SLEWING CRANE

(71) Applicant: Liebherr-Components Biberach GmbH, Biberach an der Riss (DE)

(72) Inventors: Oliver Fenker, Warthausen (DE); Michael Palberg, Ertingen-Binzwangwen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 73 days.

(21) Appl. No.: 14/652,675

(22) PCT Filed: Dec. 16, 2013

(86) PCT No.: PCT/EP2013/003798
§ 371 (c)(1),
(2) Date: Jun. 16, 2015

(87) PCT Pub. No.: WO2014/095028
PCT Pub. Date: Jun. 26, 2014

(65) Prior Publication Data

US 2015/0329333 A1 Nov. 19, 2015

(30) Foreign Application Priority Data

Dec. 17, 2012 (DE) .................... 20 2012 012 116 U

(51) Int. Cl.
*G06F 7/70* (2006.01)
*B66C 17/00* (2006.01)
(Continued)

(52) U.S. Cl.
CPC .............. *B66C 13/46* (2013.01); *B66C 13/16* (2013.01); *B66C 13/18* (2013.01); *B66C 23/022* (2013.01)

(58) Field of Classification Search
USPC ............................................ 701/50; 212/312
See application file for complete search history.

(56) References Cited

U.S. PATENT DOCUMENTS 6,351,720 B1 2/2002 Hoshina et al.
7,137,771 B2 11/2006 Maurer et al.
(Continued)

FOREIGN PATENT DOCUMENTS

CN 101428741 A 5/2009
CN 201605104 U 11/2009
(Continued)

OTHER PUBLICATIONS

ISA European Patent Office, International Search Report Issued in Patent Application No. PCT/EP2013/003798, Feb. 25, 2014, WIPO, 4 pages.

(Continued)

*Primary Examiner* — Tyler Paige
(74) *Attorney, Agent, or Firm* — McCoy Russell LLP

(57) ABSTRACT

The present invention relates to a crane, having a jib rotatable about an upright axis, at which jib a trolley is movably arranged, from which trolley a hoist rope connected to a load hook runs off, as well as a load hook position determining device for determining the position of the load hook. The load hook position may be determined optically by means of one camera only, which camera is mounted on the trolley of the crane and views from the trolley in a predetermined and thus known viewing direction downwards onto the load hook. In doing so, the position of the load hook in the camera image is determined by an image evaluator. To simplify detection of the load hook in the camera image, the image evaluator may include rope run determining means for determining the rope run of the hoist rope running off from the trolley.

20 Claims, 3 Drawing Sheets

(51) Int. Cl.

| | |
|---|---|
| ***B66C 13/46*** | (2006.01) |
| ***B66C 23/02*** | (2006.01) |
| ***B66C 13/18*** | (2006.01) |
| ***B66C 13/16*** | (2006.01) |

(56) References Cited

U.S. PATENT DOCUMENTS

| | | | | |
|---|---|---|---|---|
| 7,656,459 | B2 | 2/2010 | Catanzaro | |
| 2007/0235404 | A1* | 10/2007 | Catanzaro | B66C 13/44 212/312 |
| 2011/0187548 | A1* | 8/2011 | Maynard | B66C 15/045 340/685 |
| 2013/0345857 | A1* | 12/2013 | Lee | G01S 5/16 700/229 |

FOREIGN PATENT DOCUMENTS

| | | | |
|---|---|---|---|
| CN | 101955130 | A | 1/2011 |
| CN | 102795547 | A | 11/2012 |
| DE | 4190587 | C2 | 4/1993 |
| DE | 19725315 | A1 | 12/1998 |
| DE | 10245970 | A1 | 4/2004 |
| JP | H08324963 | A | 12/1996 |
| JP | H09142773 | A | 6/1997 |
| JP | H11349279 | A | 12/1999 |
| KR | 20010044401 | A | 6/2001 |
| WO | 9114644 | A1 | 10/1991 |
| WO | 2005082770 | A1 | 9/2005 |

OTHER PUBLICATIONS

"Construction technology," Chapter 3, p. 77, Chemical Industry Press, Available as Early as Jan. 1, 2009, Zhong, H. ed., 1 page. (See p. 7 of NPL 2, Chinese Office Action and Search Report Issued in Application No. 201380065743.0, for English Explanation of Relevance).

State Intellectual Property Office of the People's Republic of China, Second Office Action and Search Report Issued in Application No. 201380065743.0, Sep. 9, 2016, 23 pages. (Submitted with Translation of Office Action).

* cited by examiner

TOWER SLEWING CRANE

CROSS REFERENCE TO RELATED APPLICATIONS

The present application is a U.S. National Phase of International Patent Application Serial No. PCT/EP/2013/003798, entitled "Tower Slewing Crane," filed on Dec. 16, 2013, which claims priority to German Utility Model Application No. 20 2012012 116.2, filed on Dec. 17, 2012, the entire contents of each of which are hereby incorporated by reference in their entirety for all purposes.

TECHNICAL FIELD

The present invention relates to a crane, in particular tower slewing crane, having a jib rotatable about an upright axis, at which jib a trolley is movably arranged, from which trolley a hoist rope connected to a load hook runs off, as well as a load hook position determining device for determining the position of the load hook.

BACKGROUND AND SUMMARY

Tower slewing cranes may be provided with an at least approximately horizontal jib that is carried by an uprightly extending tower and may be rotated about the upright longitudinal axis of the tower. With a so-called top-slewing crane, the jib rotates relative to the tower, whereas with a bottom slewing crane the entire tower and the jib linked thereto are rotated. The distance of the load hook from the tower axis may be set by means of a trolley movable along the jib, the hoist rope connected to the load hook thereby running off via said trolley.

For different reasons it is in this context desirable to determine, as accurately as possible, the exact position of the load hook by means of an according load hook position determining device. This may be advantageous not only when the load hook is not visible to the crane operator any more because it is for example behind a wall, but also when the trolley position does not exactly correspond any more to the load hook position, i.e. if is not congruent in vertical direction (it goes without saying that due to the lowering depth of the load hook the heights of load hook and trolley differ). Such difference between the load hook position and the trolley position may have different causes, for example an uneven run of the hoist rope or dynamic displacements such as pendulum movements of the load or displacements due to wind. Depending on the task to be accomplished, it may be sufficient to determine the load hook position relative to the trolley and/or the crane only, e.g. in order to dampen pendulum movements, alternatively also an absolute load hook position in space may be needed, e.g. in order to put into practice an automated operation of cargo handling processes. In addition to such uses of the load hook position signal for controlling purposes, increased safety may be achieved as well by determining the load hook position, since the load may be examined permanently, thereby possibly also achieving redundancy of the lowering depth sensor.

From the prior art it is known to optically detect the load hook position. For example, JP 9-142773 shows a crane having a jib head from which the hoist rope runs off and on which jib head a downwardly viewing camera is mounted, the viewing direction of which camera is obstructed so as to follow pendulum movements of the load hook, so that the crane operator can permanently see the load hook via the camera. DE 197 25 315 C2 describes a steel mill crane having a trolley traveling winch movable relative to a support frame, from which trolley traveling winch the hoist rope runs off. At the support frame, several cameras are arranged the view field of which is sufficiently big to be able to detect the crane hook in various trolley traveling winch positions. With such a steel mill crane, the positions to be arrived at are relatively rigidly predetermined so that the amount of image data to be processed remains manageable. If, however, such a system were used with a tower slewing crane, a flood of data would be generated that hardly could be processed anymore.

From document WO 2005/082770 A1, a tower slewing crane is further known to the trolley of which a downwardly viewing camera is mounted for showing a video image of the load hook neighborhood to the crane operator, so that the crane operator may better recognize obstacles lying in the moving direction. Such camera system serves the purpose of visualizing obstacles and/or the set-down or pick-up area that the crane operator has to steer for, however, the position of the load hook relative to the crane or absolute in space is not determined.

DE 41 90 587 C2 describes a shipping container crane where the load hook position is determined by means of a camera mounted on the suspension device for the crane rope. Several light sources radiating upwardly are mounted on the picked up containers, which light sources are detected by the camera. However, this is not easily possible with cranes such as tower slewing cranes, which also pick up loads such as construction site products that are often significantly smaller than containers, since the large container top face is not available.

DE 102 45 970 A1, in which additionally the load is also illuminated from above by means of a light source, works in a similar way with light sources. The other light source mounted on the load to be picked up sends a light signal in upward direction to the suspension device only if the load is illuminated by the upper light source—so to say as optical echo.

Finally, U.S. Pat. No. 6,351,720 B1 shows a container crane where the load position is determined by means of a plurality of cameras one of which is mounted on the trolley of the crane and another one of which is mounted on the gantry of the crane in order to take into account torsions of the crane. This, however, brings about very extensive data processing, additionally there is the problem that the view field of the second camera is impaired due to obstacles and the like.

It is the objective of the present invention to provide an improved tower slewing crane of the abovementioned kind which avoids disadvantages of the prior art and further develops the latter in an advantageous manner. In particular, an improved determination of the position of the load hook is to be achieved for which determination a limited amount of data processing and thus limited processor capacities are sufficient, which, however, at the same time exactly determines the position without undue time delay.

According to the present invention, this objective is achieved by a tower slewing crane in accordance with claim 1. Preferred embodiments of the invention are laid down in the dependent claims.

The present invention suggests to optically determine the load hook position by means of a camera mounted on the trolley of the crane and viewing from the trolley in a predetermined and thus known viewing direction downwards onto the load hook. In doing so, the position of the load hook in the camera image is determined by an image evaluator. On the basis of the position of the load hook in the camera image and the position of the trolley, evaluation means then determine the actual load hook position. The invention is thereby based on the thought that, due to the predetermined viewing direction of the camera mounted on the trolley, the position of the load hook in the camera image corresponds to the load hook position relative to the trolley and/or is an indicator for the load hook position relative to the trolley and thus, by additionally using the position of the trolley, the absolute position of the load hook in space may be determined. If the camera views exactly vertically downwards from the trolley, the position of the load hook in the camera image and/or the local deviation of the load hook from the center of the camera image is an indicator for the transverse displacement and/or horizontal displacement of the load hook vis-à-vis the trolley, wherein said horizontal displacement of the load hook vis-à-vis the trolley may be determined by taking into account the respective lowering depth of the load hook, i.e. the distance of the load hook from the trolley and a possibly set zoom ratio of the camera. Advantageously, a plurality of cameras or images from a plurality of visual axes are not required, since the determination of the position may be effected based on one camera only and/or based on one camera image only, thereby significantly saving processing power.

The distance of the load hook from the trolley can thereby be determined in a plurality of manners. On the one hand, the lowering depth of the load hook may be determined from the unwound hoist rope length, which, even in the case of not exactly even hoist rope run, provides a sufficiently accurate quantitative indicator for the distance of the load hook from the trolley and/or the camera mounted therein so as to determine, from said distance of the load hook from the trolley and the image position of the load hook determined in the camera image and/or the displacement of the load hook from the image's center, the actual relative position and/or the actual horizontal displacement of the load hook vis-à-vis the trolley.

In the alternative or in addition, the distance of the load hook from the trolley and/or the camera mounted thereat may be determined from the camera image itself, in particular by means of an image evaluator determining the number of pixels of the image representation of the load hook and/or an attachment and/or mounting part connected thereto such as, for example, a pulley or another structural part of a crane that is intended to be positioned in the vicinity of the load hook or also a marker and/or marking associated therewith, and/or the size of the load hook or of said attachment or of said marker in the camera image. If the size of the load hook and/or the size of the attachment or of the marker is known, the distance of the crane hook and/or of the attachment or the marker may be determined very accurately based on the zoom ratio of the camera and the number of pixels and/or the size of the representation in the camera image. Determination of the distance of the load hook from the trolley by means of pixel count may, in addition to the alternative lowering depth determination, be effected based on, e.g., the unwound length of the hoist rope so as to achieve a redundant system for the determination of the lowering depth of the load hook and thus to increase safety. Where appropriate, optical determination by means of pixel evaluation may, however, also be provided as an alternative.

Identification of the load hook in the camera image provided by the camera may basically be effected in a plurality of ways, for example by means of pixel evaluation and/or contour evaluation and/or color evaluation. In particular, a pixel pattern corresponding to the load hook and/or the attachment connected thereto such as a pulley or a particular marker, as well as the outer contour and color of the load hook and/or the attachment connected thereto may be determined. In doing so, algorithms per se known in image processing such as binary image creation, edge detection or selection of a characteristic may be used for analyzing the camera image. In order to increase the probability of detection and/or to simplify identification of the crane hook or the marker associated therewith, the image provided may be subjected to a spectral analysis in which, e.g., reflective properties may be analyzed.

In order to simplify detection of the load hook in the camera image, the image evaluator may include rope run determining means for determining the rope run of the hoist rope running off from the trolley. In the camera image provided, the hoist rope running off from the trolley normally possesses a very characteristic contour in the form of a very narrow, long straight line and/or an only very slightly curved, long, narrow line the starting point of which lies within a relatively narrowly delimited area in the camera image due to the deflection at the trolley and may thus be easily identified. In particular, the hoist rope running off from the trolley creates, in the camera image, two acute-angled and/or conically tapering lines due to the usual reeving at the load hook and/or the pulley connected thereto, wherein at least approximately the position of said load hook may be assumed at the intersection of aforesaid lines.

The position specification to be determined for the position of the load hook may basically be provided in a plurality of ways, wherein advantageously an absolute coordinate position specification is effected in an absolute coordinate system which, e.g., may have its origin in the base of the crane, wherein, e.g., the longitudinal axis of the tower may describe the Z-axis, the jib may describe the X-axis and an axis perpendicular thereto may describe the Y-axis. The image evaluator may, at first, determine the image position of the load hook in the camera image in a relative coordinate system, for example a trolley coordinate system having its origin in the camera and/or the trolley and being aligned parallel to the aforementioned absolute coordinate system, wherein the Z-axis, however, may in accordance with the optical axis of the camera run inversely to the Z-axis of the absolute system. Position specifications in such relative coordinate system which may shift due to movements of the trolley, are then converted into position specifications in the aforesaid absolute coordinate system by the position determining means taking into account the position of the trolley.

In order to simplify image evaluation and to reduce data volume, a marker of predetermined size and/or predetermined contour may, according to a further development of the invention, be arranged at the load hook or the pulley that is connected thereto and by means of which the hoist rope is deflected at the load hook, which marker is provided at the top face of the load hook and/or of the pulley and/or is visibly oriented towards the trolley and/or the camera mounted thereon. Said marker may be adapted to be a separate component, for example in the form of a plate or a sight disk attached to the top face of the pulley, wherein such separate component may be mounted on and/or attached to, for example welded on or screwed to, the load hook or the pulley connected thereto.

In the alternative or in addition to such a separate marker component, also the load hook and/or the pulley itself may be adapted to be a marker, for example by means of an appropriate contour of a load hook section and/or pulley section visible in the direction of the trolley, wherein for example the load hook with its top face head section may for example have an angular or round contour and may be contoured, for example, in the form of a mushroom- or collar-shaped enlarging that is triangular if viewed from above.

As marker, for example a ring arrangement of the type of a sight disk or also another geometrical basic contour or geometrical base and/or geometrical elementary form such as, e.g., triangle, quadrangle, polygon, circle, oval or ellipse, straight or curved lines or mixed forms and/or combinations thereof may be provided, the marker advantageously being composed of segments contrasting each other, for example a white circle with a black dot in its center, and/or possibly having strong colors differing from the usual colors of the surroundings, e.g. dots of luminescent paint, so as to simplify identification of the marker in the camera image.

In order to be able to more easily determine not only the position, but also the orientation of the marker in the camera image, a marker advantageously differing from rotation-symmetric forms, particularly unambiguously oriented marker contours may be used, for example in the form of a "T" or an isosceles, nonequilateral triangle or the like. If such markers are used, not only the exact position of the load hook, but also a rotation vis-à-vis the orientation of the jib may be determined by means of the image evaluator and an according evaluation of the camera image, which rotation may for example occur due to rotation of the load hanging from the load hook.

Furthermore, in particular in the case of difficult mounting conditions for markers to be separately fixed to the crane hook, the visible hook itself may be used as marker, for example in the above described manner by means of a particular contouring of the head section facing the the trolley. This may be effected on the basis of face recognition as used in monitoring systems. Suitable geometrical characteristics of the crane hook may be used as marker and/or marking. This brings about the advantage that separate marker attachments, which might be damaged or become dirty during operation, are unnecessary. According to an advantageous embodiment, only a determined number of predetermined characteristics have to be visible. Even in the case of partly covered single characteristics, the position and orientation of the crane hook is still reliably recognized.

In order to keep the data processing volume during image evaluation as small as possible, the image section and/or the size of the image to be evaluated may, according to an advantageous further development of the invention, be variably controlled in dependence on different operational parameters. A camera control device may in particular set the zoom ratio of the camera in dependence on the lowering depth of the load hook, wherein for example the lowering depth determined from the unwound length of the hoist rope may be used in this context for presetting the zoom ratio, and/or an adjustment or readjustment of the zoom ratio may be effected after a performed distance determination by means of pixel count and/or determination of the image representation size as described above. In particular, the zoom ratio may be increased as lowering depth increases and/or distance of the load hook from the trolley increases, so as to achieve a certain size of the representation of the crane hook or the marker associated therewith in the camera image. It significantly facilitates marker and/or load hook identification in the camera image, if the image evaluator—at least approximately—knows in advance how big the pixel pattern to be identified is in the overall image and/or what the ratio of the area of the image representation of the marker and/or the load hook to the area of the overall image is.

In the alternative or in addition, said zoom ratio may be varied by the camera control device also in dependence on other parameters, in particular in dependence on the result of an image evaluation attempt. If, at a previously set zoom ratio, the load hook or the marker associated therewith cannot be identified in the image, the zoom ratio may be decreased so as to be able to scan a larger image section of the neighborhood. If required, the zoom ratio may be decreased iteratively a plurality of times, so as to scan, in a plurality of steps, continuously larger areas. In the alternative or in addition, the zoom ratio may, however, also be increased, if the load hook and/or the marker associated therewith could not be identified in a camera image, which, as the case may be, can be caused by a much too small representation of the load hook in the image due to a significantly too small zoom ratio, so that image definition and/or pixel number do not suffice for identifying the known contour pattern of the marker and/or the load hook and/or the pulley.

In the alternative or in addition to such readjustment of the zoom ratio of the camera, the camera control device and/or the image evaluator may also vary an area to be evaluated, which area lies within the camera image provided by the camera, so as to keep the data volume to be evaluated as small as possible. The image section of interest may be expanded in particular if the marker and/or the load hook have been lost in the previously evaluated image section, for example because the load hook has moved out of said image section due to stronger pendulum movements or a stronger wind load. If the marker or the load hook get lost in the image section examined by the image evaluator, said image section may be expanded once or also iteratively in a plurality of steps, if necessary until it comprises the entire camera image. Advantageously, the image evaluator may be adapted such that, when expanding the image section of interest and/or to be evaluated, only the added image section area is newly evaluated, for example only the frame-shaped image section part that has been added around the previous image section due to expansion of the image section.

In the alternative or in addition to such one-time or iterative expansion of the image section which is evaluated by the image evaluator so as to identify the position of the load hook or the marker associated therewith, the image section may be shifted and/or decreased in the camera image provided, if the load hook or the marker associated therewith can be identified in the camera image, preferably such that the new image section in turn to be examined is centered in relation to the identified position of the load hook and/or the marker associated therewith, i.e. such that the identified marker lies at the center of the new image section. In the alternative or in addition, the image section may be decreased once or iteratively, in particular such that the pixel pattern and/or the corresponding image contour pattern representing the marker and/or the load hook covers a predetermined portion of the area of the respective image section, e.g. 20% of the area of the image section used for evaluation.

Advantageously, the position of the load hook may be determined from the camera image not only relative to the trolley of the crane, but also absolutely and/or relative to the load hook neighborhood, for example the construction site neighborhood. According to a further development of the invention, the position determining device may comprise neighborhood determining means for determining, from the camera image taken, the load hook neighborhood, in particular in the form of characteristic obstacle and/or neighborhood contours, wherein the position determining means for determining the load hook position from the determined image position of the load hook in the camera image may be adapted such that the load hook position is determined relative to the load hook neighborhood.

The load hook position relative to its neighborhood determinable in the above described manner from the camera image, may advantageously be determined for the purpose of controlling crane movements, in particular for arriving at a load hook target, for example a setting-down or picking-up position, or for stopping crane movements or for automatically altering a traveling path of the load hook so as to prevent a collision of the load hook and/or a load picked up therewith with an obstacle identified in the camera image such as, e.g., an edge of a building. In this context, the crane may comprise load hook target control means for controlling crane movements in dependence on the load hook position determined relative to the load hook neighborhood and/or collision prevention control means for stopping or altering crane movements in dependence on the load hook position determined relative to the load hook neighborhood.

In the following, the invention is described in more detail on the basis of a preferred example of an embodiment and related drawings. In said drawings show:

DETAILED DESCRIPTION

Figure 1:
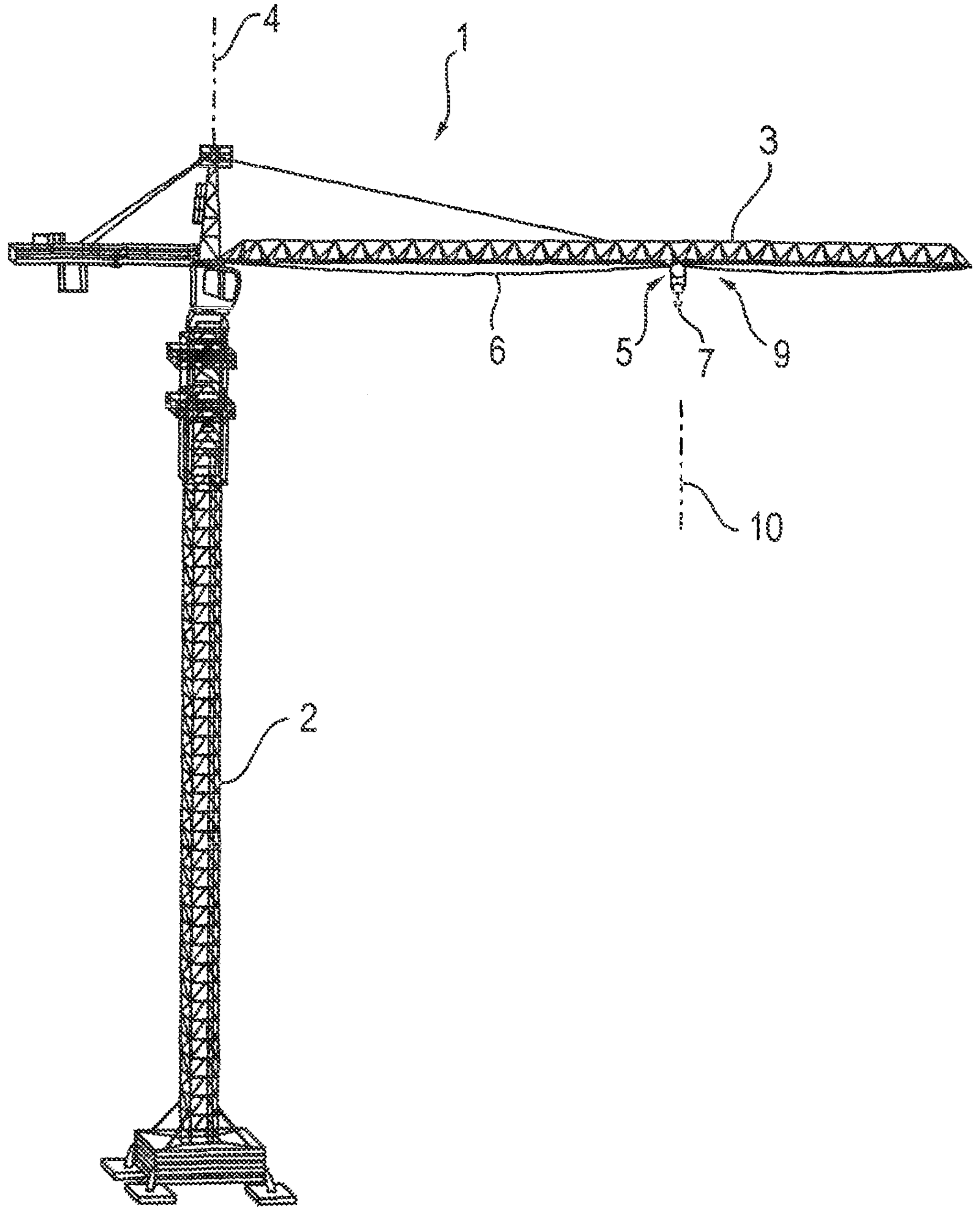
FIG. 1: a schematic representation of a tower slewing crane at the jib of which a movable trolley is provided from which trolley a hoist rope connected to the load hook runs off and at which trolley a camera for determining the position of the load hook is arranged.

As is shown by FIG. 1, the crane may be adapted to be a top-slewing tower slewing crane 1 the uprightly extending tower 2 of which carries a jib 3 as well as a counter-jib. Said jib 3 may be rotated relative to tower 2 about the tower's upright longitudinal axis 4 and may assume an at least approximately horizontal position. A trolley 5 is movably suspended from said jib 3, so that the trolley 5 may be moved substantially along the entire length of jib 3 so as to be able to vary the working radius of load hook 7. Said load hook 7 is in this context fixed to a hoist rope 6 running off via said trolley 5 so as to be able to lower and lift load hook 7. In a manner known per se, a pulley 13 may be provided at the load hook 7, cf. FIG. 2, via which pulley the hoist rope 6 is diverted and/or reeved at the load hook 7.

Figure 2:
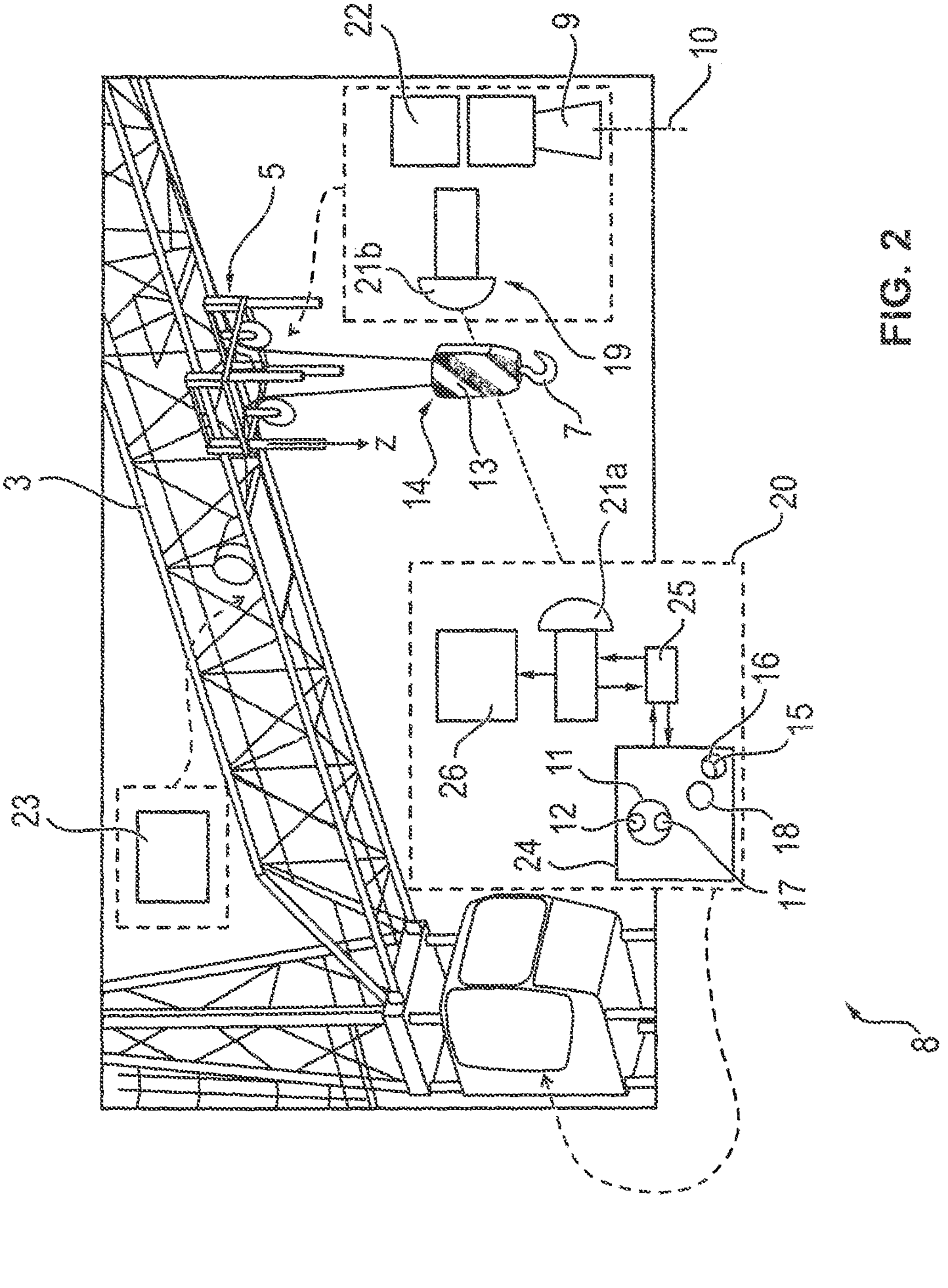
FIG. 2: an enlarged, partial representation of the trolley provided at the jib and of the system components for image transfer and evaluation as well as position determination, which system components are associated with the camera.

As is shown by FIG. 2, a load hook position determining device 8 comprises a camera 9 mounted at the trolley 5, which camera is, together with trolley 5, movable and views basically vertically downwards from trolley 5. As is shown by FIG. 2, the visual axis of camera 9 and the Z-axis of the local and/or relative trolley coordinate system can be coaxial to each other.

The image data provided by camera 9 may advantageously be transferred to a data processing and evaluation system 20 by a wirelessly working transfer means 19, e.g. in the form of a wireless transmission device, which may advantageously be arranged in the area of the operator's cab or the crane control unit and which may comprise an according transceiver unit 21*a* that may communicate with the transceiver unit 21*b* of the transfer means 18 at the trolley. Basically, data evaluation could be effected directly at the camera 9 and/or the trolley 5, image data is, however, preferably only collected there and then transferred and evaluated at a different place so as to be able to build the system in the area of the trolley in a small and lightweight manner.

In order to provide camera 9 with power, an energy store 22 such as, e.g., in the form of an accumulator may be provided at the trolley 5, which energy store may be charged by means of a charging station 23 which may be arranged at the jib 3 for example in the area of a parking position of trolley 5 so as to be able to charge energy store 22 during out of operation periods of the crane.

The data processing and evaluation system 20 may comprise a central processor 24 for example in the form of an industrial personal computer having an image processing system, which processor may be connected to the transceiver 21 via a video server 25 so as to receive and/or retrieve the image signals of camera 9 on the one hand, and to be able to send control signals to camera 9 on the other hand.

As is shown by FIG. 2, also a video display 26 may advantageously be provided in the area of the crane operator's cab, so as to be able to display to the crane operator, in addition to the determination of the position, also the image of camera 9.

In order for the image evaluator 11, which is carried out in processor 24, to be able to detect and identify load hook 7 in the camera image provided by camera 9, characteristics of load hook 7 and/or pulley 13 connected thereto are advantageously previously defined, for example geometrical areas, shapes, contours, colors and the like, wherein, in an advantageous further development of the invention, a marker 14 may be provided at the top face of load hook 7 and/or pulley 13 so that the marker 14 is visible to the camera 9.

Figure 3:
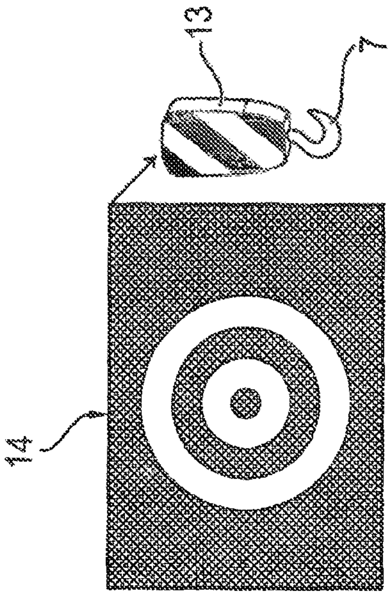
FIG. 3: a representation of a marker provided on the top face of the pulley connected to the load hook, which marker is identifiable in the camera image provided by the camera.
Figure 4:
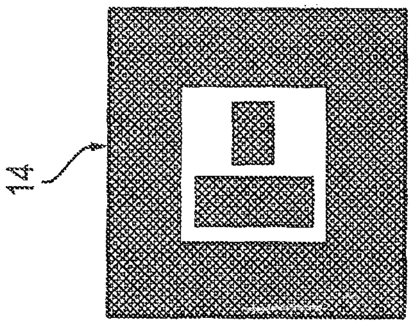
FIG. 4: a representation of a marker similar to FIG. 3, wherein the marker, contrary to FIG. 3, is unambiguously oriented so as to allow, in addition to determination of the position, also allow determination of the orientation and/or rotatory position of the load hook.

As is shown by FIG. 3, the marker 14 may, similar to a sight disk, consist of rings rich in contrast to each other and placed into each other. In the alternative to such rotation-symmetric marking, however, advantageously also an unambiguously oriented marker 14 as shown in FIG. 4 may be used, for example in the shape of a "T", a high-contrast representation advantageously being used in this case as well. It goes without saying, however, that instead of such "T", the marker 14 as well may also have other characteristics for determining the orientation, for example two or more rotation-symmetric markers in geometric relation to each other may be provided, and/or other rectangular marking forms related to orientation may be used and/or geometric shapes of the load itself or of the load pick up device such as the spreader of a container crane may be used as marker.

Camera 9 is advantageously controlled by the image processing and evaluation system 20 by means of control signals, wherein said control signals may in this context also be transferred via the radio circuit shown in FIG. 2. The image evaluator 11 attempts, based on the predefined marker 14, to detect the load and/or the load hook 7 within the image provided by camera 9. An analysis of the camera image provided may in this context be effected by means of a plurality of algorithms such as, e.g., a binary image creation, an edge detection and/or selection of a characteristic.

Based on the updating rate of the camera images provided by camera 9 and based on the evaluation rate of image evaluator 11 connected thereto, the load hook 7 and/or the load located thereon may be determined not only statically in the image, but also in the case of dynamic movements of the load. In this context, tracing of the load, so-called tracking, may be effected.

In order to support identification of marker 14 in the camera image, the lowering depth of load hook 7 may advantageously be permanently provided by the crane control, on the basis of which lowering depth it can at least approximately be estimated at which distance from camera 9 the load hook 7 is positioned. The image processing and evaluation system 20 then sets the camera ratio of camera 9 accordingly.

Analysis of the respective camera image provided may be effected continuously, preferably by means of edge detection, binary image generation and selection of characteristics in respect of the known marker 14. In this context, processing is carried through advantageously within a predeterminable image section in a determined region of the camera image. Since the size, depending on the operational case, may be kept very small, computing effort is hereby considerably minimized. The image section may in this context be chosen to be minimally that small that it basically corresponds to the size of the marker. In the alternative or in addition, the image section to be analyzed may maximally correspond basically to the entire size of the complete camera image.

The position and/or the size of said image section may be determined on the basis of the last known marker positions and an estimated prognosis. For this purpose, for example a so-called Kalman filter or also other filtering facilities which may make a prognosis based on past values may be used.

In so far as at the time of initialization of image processing no past marker positions are available for a prognosis, the image section to be examined may be laid into the image arbitrarily. If no marking is found in this image section, the image section may continuously be expanded, until marker 14 lies within the image section and may be detected.

As soon as marker 14 may be detected in the camera image, the image evaluator 11 determines the image position of load hook 7 and/or of marker 14 in the camera image, on the basis of which the position determining means 12 then determine the load hook position in the relative coordinate system of trolley 5. Said relative trolley coordinate system may be chosen such that it has its origin in the optical axis of camera 9 and the zero point of the lowering depth which may lie in the trolley 5.

On the basis of the known size of marker 14, the currently set zoom ratio of camera 9 as well as the number of pixels of marker 14 in the camera image, which number of pixels is measured by the sensor system, an exact distance determination of marker 14 from trolley 5 may be effected. Herefrom, the Z displacement and/or the Z difference of load hook 7 relative to the lowering depth may be determined, which lowering depth may be determined for example by determining the unwound hoist rope length. Due to the separate measurement of the actual lowering depth by means of the pixel size of marker 14 in the camera image, redundancy of the conventional lowering depth sensor may be achieved.

Since in real use the load is never really at rest due to crane movements, the influence of wind or the dynamics of the crane, the load is swinging, wherein the pendulum frequency is dependent on the rope length of hoist rope 6. The pendulum amplitude is dependent on the mass and other factors such as movement dynamics or wind entry.

In order to improve, during image evaluation, the detection probability of detecting marker 14 in the camera image, here as well an estimate may be effected as to where load hook 7 will presumably be during subsequent measurements, wherein here, too, the aforesaid Kalman filter may be employed.

If marker 14 moves out of the camera image due to a too large pendulum amplitude, the image evaluator may lose marker 14. In order to detect marker 14 again as fast as possible, one may proceed as follows:

At first, the camera image's image section to be analyzed may, for example, be inflated and/or expanded and/or shifted so as to become an image section in which re-entry of marker 14 is expected. In the alternative or in addition, also the entire camera image may be defined as image section, in particular if the available processing power is sufficiently large.

In the alternative or in addition to such alteration of the image section, the camera 9 also may, after having lost marker 14, zoom back one or several steps so as to expand the image area. Based on an image area expanded in such a way, probability is high that the marker is positioned within the image again. In order to compensate the disadvantages of a hereby decreased marker size, the zoom ratio of camera 9 may be increased and also again decreased iteratively in a plurality of steps.

Figure 5:
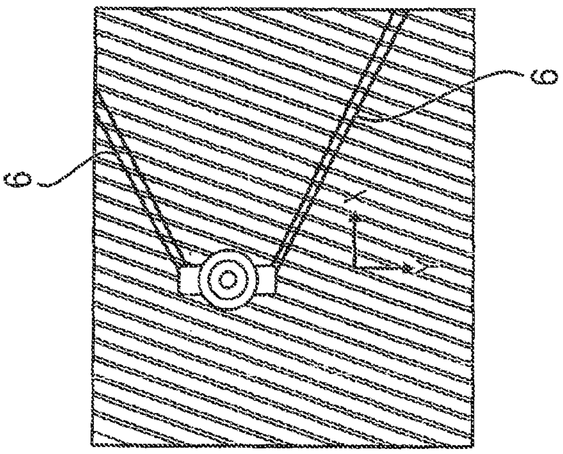
FIG. 5: a camera image provided by the camera and showing the load hook, wherein the hoist rope run represented in the camera image is shown, from which hoist rope run the load hook position may also be determined and/or by means of which identification of the load hook or the marker associated therewith in the camera image may be simplified.

In the alternative or in addition to the aforesaid image processing strategies, the image evaluator 11 may comprise rope run determining means 17, by means of which the run of the hoist rope 6 in the camera image is determined, as is shown by FIG. 5. Based on the detected hoist rope run in the camera image, the position of load hook 7 may be determined or at least the area in which load hook 9 and/or marker 14 must lie may be narrowed down, so that said hoist rope run determination may be provided in the alternative or in addition to detection of said marking and/or of load hook 7 directly from the camera image.

Determination of the load hook position and/or narrowing down of the area in which load hook 7 must be, with the help of rope run determination is based on the assumption that hoist rope 6 possesses, when reeved at the pulley 13, a conical run in the camera image, in particular that it runs conically towards the load, cf. FIG. 5, so that load hook 7 and/or the load and its position may be determined as end of a cone defined by hoist rope sections.

In order to heighten the detection probability regarding interesting areas and contours in the camera image, the measured image may, in a further development of the invention, also be subjected to a spectral analysis. In doing so, for example the reflective properties of the characteristics of the load, the load hook 7 or the marker 14 in determined spectral areas may broaden the range of characteristics and may be used for identification.

Such a procedure may be part of a prefiltering of the image, which significantly reduces the amount of image data then to be examined with the help of the aforementioned algorithms. The algorithms' effort for the detection of the load hook position is thus decreased considerably. Even adverse climatic conditions such as snow, ice, rain, fog, sunlight, casting of shadows etc. may be compensated at least in part.

Such a spectral analysis may advantageously also be optimized by the use of special lacquers for marker 14, for example by the use of lacquers or other surface coatings possessing only minor reflective properties in the near-infrared range.

For the aforementioned prefiltering, for example a Landsat algorithm known per se may be used.

The invention claimed is:

1. A crane, in particular a tower slewing cranecomprising: a jib rotatable about an upright axis, at which jib a trolley is movably arranged, from which trolley a hoist rope connected to a load hook runs off, as well as a load hook position determining device for determining a load hook position, wherein the load hook position determining device comprises a camera arranged at the trolley and oriented downward towards the load hook in a predetermined viewing direction, an image data processing and evaluation system comprising a processor, an image evaluator carried out in the processor for determining an image position of the load hook in a camera image provided by the camera via at least one of pixel evaluation, contour evaluation, and color evaluation, and position determining means carried out in the processor for determining the load hook position based on the determined image position of the load hook in the camera image while taking into account a position of the trolley and providing a load hook position signal.

2. The crane according to claim 1, wherein the image evaluator includes rope run determining means for determining a hoist rope run in the camera image, and the image evaluator is adapted such that the position of the load hook in the camera image is determined in dependency of the determined hoist rope run.

3. The crane according to claim 1, wherein the image evaluator is adapted such that the load hook position is determined as being a point of intersection of two hoist rope lines identified in the camera image.

4. The crane according to claim 1, wherein the load hook position determining device comprises distance determining means for determining a distance of the load hook from the trolley, wherein said distance determining means has a pixel counter for determining a number of pixels of an image area of the load hook and/or a marker identified in the camera image.

5. The crane according to claim 4, wherein a lowering depth determining means is provided for determining a lowering depth of the load hook based on an unwound length of the hoist rope.

6. The crane according to claim 5, wherein a horizontal displacement of the load hook in relation to the trolley is determinable by the position determining means based on the determined image position of the load hook in the camera image taking into account a respective set zoom ratio of the camera and the determined lowering depth/distance of the load hook from the trolley.

7. The crane according to claim 6, wherein a camera control device for controlling camera settings is provided and adapted such that the zoom ratio of the camera is set variably in dependency of the load hook lowering depth.

8. The crane according to claim 7, wherein the camera control device is adapted such that the zoom ratio of the camera is increased and/or decreased in dependence on recognition of the load hook and/or the marker provided thereon in the camera image provided by the camera, in particular such that when the load hook and/or the marker associated therewith is not recognized, the zoom ratio is decreased once or iteratively.

9. The crane according to claim 4, wherein the image evaluator includes image section control means for enlarging an image section of the camera image to be evaluated by the image evaluator, which enlarging is effected in dependence on recognition of the load hook and/or the marker associated therewith, wherein said image section control means are adapted such that in the case of non-recognition of the load hook and/or the marker associated therewith, starting with a small image section, such image section is enlarged once or iteratively.

10. The crane according to claim 9, wherein the image evaluator includes pixel evaluation means for recognizing a pixel pattern corresponding to the load hook and/or an attachment connected thereto such as a pulley, as well as color recognition means for recognizing, in the camera image, a color and/or color combination corresponding to a color and/or color combination of the load hook and/or the attachment thereof.

11. The crane according to claim 10, wherein the image evaluator has contour recognition means for recognizing, in the camera image, an outer contour corresponding to the load hook and/or its attachment, and the load hook position is determined based on the outer contour of the load hook and/or the attachment mounted thereto.

12. The crane according to claim 1, wherein a marker is attached to the load hook and/or a pulley connected thereto which marker is visibly oriented towards the trolley, and the image evaluator is adapted such that in the camera image a contour and/or pixel pattern corresponding to the marker is identified.

13. The crane according to claim 12, wherein the marker and/or the load hook and/or the pulley includes a geometrical base such as a circle, a polygon, a line and/or a base pattern combined of several geometrical bases.

14. The crane according to claim 12, wherein the marker and/or the load hook and/or the pulley are adapted in an unambiguously oriented manner and the image evaluator has orientation determining means for determining an orientation of the load hook, in particular determining a rotation angle of the load hook in relation to the upright axis.

15. The crane according to claim 1, wherein trolley position determining means are provided, which trolley position determining means include travel position determining means for determining a trolley position relative to the jib and slewing position determining means for determining a slewing position of the jib relative to the upright axis, wherein the upright axis is a rotational axis, wherein the load hook position determining means are adapted such that the load hook position is determined based on the determined trolley position relative to the jib, the slewing position of the jib and the image position of the load hook in the camera image of the camera.

16. The crane according to claim 1, wherein the load hook position determining device includes neighborhood determining means for determining a load hook neighborhood, in particular in terms of characteristic obstacle and/or neighborhood contours, based on the camera image, wherein the position determining means for determining the load hook position based on the determined image position of the load hook in the camera image are adapted such that the load hook position is determined relative to the load hook neighborhood.

17. The crane according to claim 16, wherein load hook target control means are provided for controlling crane movements in dependency of the determined load hook position relative to the load hook neighborhood and/or collision prevention control means for stopping or altering crane movements in dependency of the determined load hook position relative to the load hook neighborhood.

18. A crane, in particular a tower slewing crane, comprising: a jib rotatable about an upright axis, at which jib a trolley is movably arranged, from which trolley a hoist rope connected to a load hook runs off, as well as a load hook position determining device for determining a load hook position, wherein the load hook position determining device comprises a camera arranged at the trolley and oriented downward towards the load hook in a predetermined viewing direction, an image data processing and evaluation system comprising a processor, an image evaluator carried out in the processor for determining an image position of the load hook in a camera image provided by the camera, and position determining means carried out in the processor for determining the load hook position based on the determined image position of the load hook in the camera image while taking into account a position of the trolley and providing a load hook position signal, wherein the image evaluator has contour recognition means for recognizing, in the camera image, an outer contour corresponding to the load hook and/or its attachment, and wherein the load hook position is determined based on the outer contour of the load hook and/or the attachment mounted thereto.

19. A crane, in particular a tower slewing crane, comprising: a jib rotatable about an upright axis, at which jib a trolley is movably arranged, from which trolley a hoist rope connected to a load hook runs off, as well as a load hook position determining device for determining a load hook position, wherein the load hook position determining device comprises a camera arranged at the trolley and oriented downward towards the load hook in a predetermined viewing direction, an image data processing and evaluation system comprising a processor, an image evaluator carried out in the processor for determining an image position of the load hook in a camera image provided by the camera, and position determining means carried out in the processor for determining the load hook position based on the determined image position of the load hook in the camera image while taking into account a position of the trolley and providing a load hook position signal, wherein the image evaluator is adapted such that the load hook position is determined as being a point of intersection of two hoist rope lines identified in the camera image.

20. The crane according to claim 1, wherein the determination of the load hook position is effected based on one camera only and/or based on one camera image only.

* * * * *